United States Patent
Sasai

[19]

[11] Patent Number: 5,917,171
[45] Date of Patent: Jun. 29, 1999

[54] BAR CODE READING APPARATUS

[75] Inventor: Yoichi Sasai, Neyagawa, Japan

[73] Assignee: Matsushita Electric Industrial Co., Ltd., Osaka, Japan

[21] Appl. No.: 08/811,440

[22] Filed: Mar. 3, 1997

[30] Foreign Application Priority Data

Mar. 4, 1996 [JP] Japan ................................. 8-045762

[51] Int. Cl.⁶ ............................................. G06K 7/10
[52] U.S. Cl. .................... 235/462.01; 235/462.2
[58] Field of Search ........................ 235/462, 472, 235/454, 438, 470, 469, 462.01, 462.2

[56] References Cited

U.S. PATENT DOCUMENTS

| | | | |
|---|---|---|---|
| 3,563,635 | 2/1971 | Lang ........................................ | 235/472 |
| 4,460,120 | 7/1984 | Sheppard et al. ...................... | 235/472 |
| 4,918,297 | 4/1990 | Kurimoto ................................ | 235/383 |
| 5,051,567 | 9/1991 | Tedesco .................................. | 235/472 |
| 5,250,792 | 10/1993 | Swartz et al. .......................... | 235/472 |
| 5,361,158 | 11/1994 | Tang . | |
| 5,528,022 | 6/1996 | Nakazawa . | |
| 5,545,886 | 8/1996 | Metlitsky et al. . | |
| 5,586,212 | 12/1996 | McConica et al. .................... | 235/473 |
| 5,640,001 | 6/1997 | Danielson et al. .................... | 235/472 |
| 5,698,835 | 12/1997 | Dvorkis et al. ........................ | 235/462 |

FOREIGN PATENT DOCUMENTS

| | | |
|---|---|---|
| 01 147783 | 6/1989 | Japan . |
| 01 292485 | 11/1989 | Japan . |
| 03048382 | 3/1991 | Japan . |
| 03054685 | 3/1991 | Japan . |
| 04333187 | 11/1992 | Japan . |
| 04369786 | 12/1992 | Japan . |
| 06176186 | 6/1994 | Japan . |

*Primary Examiner*—Le Thien Minh
*Attorney, Agent, or Firm*—McDermott, Will & Emery

[57] ABSTRACT

The present invention relates to a bar code reading apparatus that is useful for recognizing by human eyes whether a light beam is being projected onto a bar code symbol. The bar code reading apparatus contains a first and second light source to radiate a first ray and a second visible ray, respectively. The second visible ray has higher visibility than first light beam for human eyes. As a result, an operator can easily recognize whether the light beams are projected onto a bar code symbol. Another bar code reading apparatus contains first and second photo detectors for receiving a first and a second reflected beam, respectively. With this arrangement two different bar code symbols can be simultaneously read by the bar code reading apparatus.

20 Claims, 6 Drawing Sheets

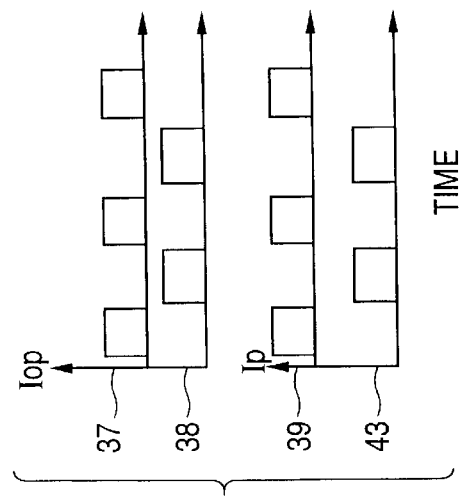
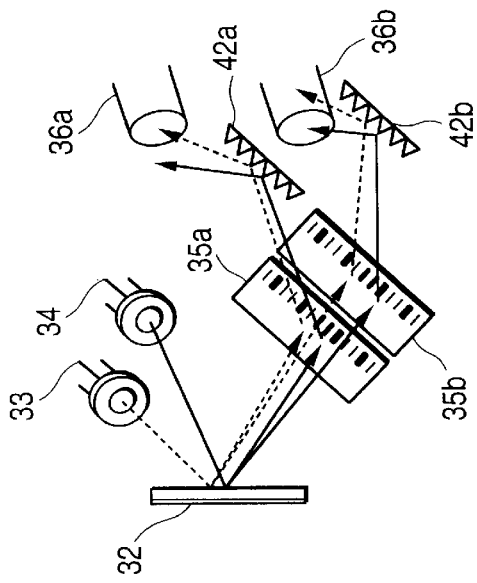
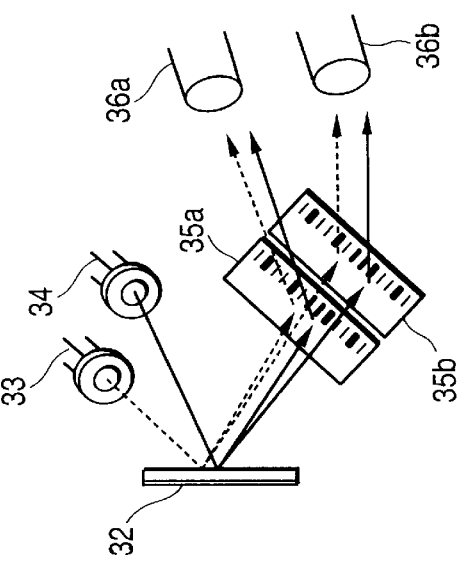
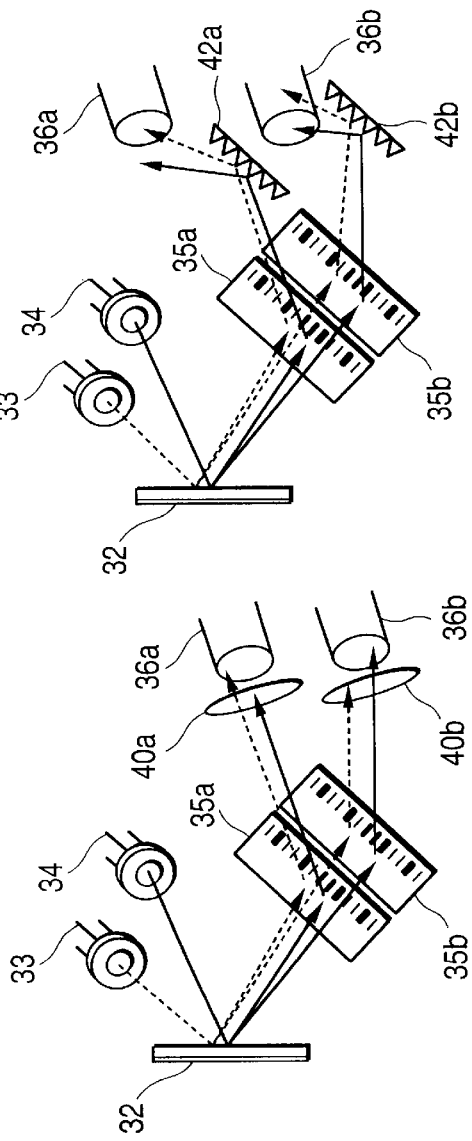
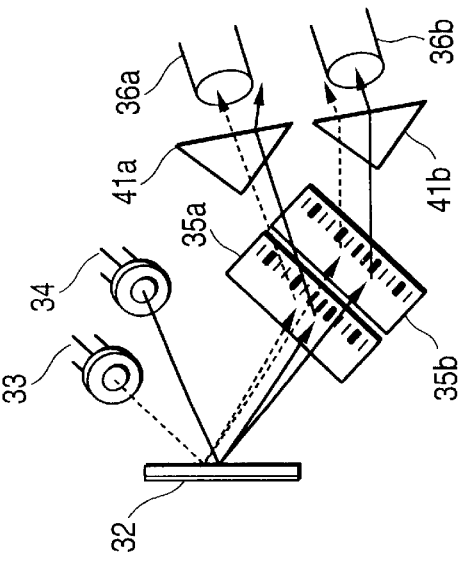

BAR CODE READING APPARATUS

BACKGROUND OF THE INVENTION

This invention relates to a bar code reading apparatus using a visible rays.

Bar code reading devices are being utilized in many fields, such as, at the checkout counters in supermarkets, the management of inventories, or in the management of a manufacturing process in a factories, etc.

The demand for a bar code reading apparatus using a laser diode radiating a red beam has been increasing, because of the requirements for credibility, maneuverability, and miniaturization.

FIG. 1 shows a block diagram of a currently used bar code reading apparatus. A light beam source 1, such as a light emitting diode (LED) or a laser diode, radiates a light beam onto a bar code symbol 3 via a scanner 2, such as a mirror. A reflected light beam 4 is supplied to a photo detector 5, such as a photo diode, where the reflected light beam 4 is converted to corresponding electric signal 6. The electric signal 6 is amplified by an amplifier 7, and the amplified electric signal 8 is supplied to a wave forming circuit 9. The wave forming circuit 9 supplies a pulse train signal 10 corresponding to the amplified electric signal 8. A decoder circuit 11 decodes the pulse train signal 10, and supplies an output signal 12 to following stages (not shown).

According to the bar code reading apparatus depicted in FIG. 1, the bar code symbol 3 is scanned by the scanner 2 or by a manual scanning operation of the light beam. The reflected light beam 4 is eventually converted to a decoded signal by the decoder circuit 11.

FIGS. 2(a) and 2(b) show graphs representing a relationship between a wave length of the light beam and a reflection index of a colored bar code symbol. As will be apparent from the graph identified as "Red" in FIG. 2(a), a light beam, which is approximately 600 nm or more in wave length, is reflected when the color of bars in the bar code symbol is red. On the other hand, if the light beam is less than 600 nm in wave length, the light beam is almost absorbed by red bars. As a result, the bar code reading apparatus can identify a contrast between red bars and spaces on a bar code symbol, if the wave length of the light beam is less than 600 nm. In particular, such a light beam is reflected enough by spaces, and is absorbed enough by red bars.

Similarly, orange bars reflect the light beam, when the wave length of the light beam is approximately 550 nm or more. Yellow bars reflects the light beam, when the wave length of the light beam is approximately 500 nm or more.

As will also be apparent from the graphs shown in FIG. 2(b), it is understood that it is necessary to provide a light beam having the wave length between 620 nm through 700 nm to read the bar code symbol containing green, blue, or magenta bars, because these three colored bars absorb the light beam having a wave length between 620 nm and 700 nm.

As aforementioned, it is understood that there is a close relationship between the color of the bars of a bar code symbol and the wavelength of the light beam being projected onto the bar code symbol. It should be noted that the wave length of a red laser beam is not capable for reading red, orange or yellow colored bars of a bar code symbol.

A current bar code reading apparatus uses a red laser beam, and the power of the beam is limited up to 1 mW pursuant to a safety standard, such as International Electrotechnical Commission (IEC) standard, in order to protect human eyes. On the other hand, in order for human eyes to recognize whether light beams are being projected onto a bar code symbol, a laser diode is required to radiate light beams having a relatively short wave length, such as 635 nm through 670 nm, which are visible by human eyes. However, it is the fact that the intensity of a red laser beam is still insufficient for human eye recognition under strong white light, such as fluorescent light.

Moreover, the value of the bar code reading apparatus, as well as the number of items being handled by a bar code system, has been increasing. Therefore, the quantity of the information represented by bar code symbols had to be increased. In order to increase the capacity of information, two dimensional bar code systems have been developed. Two dimensional bar code symbols contain horizontal information and vertical information. A bar code reading apparatus for reading the two dimensional bar code symbols must scan a light beam diagonally across the bar code label, such as a TV scanning method. It should be apparent that this is a shortcoming of a limitation of scanning direction. As a result, the error rate of scanning two dimensional bar code symbols is rather high.

Another example of bar code reading apparatus is described in the U.S. Pat. No. 5,361,158, issued to Tang on Nov. 1, 1994. This patent discloses a multiple source optical scanner, which employs a plurality of scanning light sources. According to the description in the patent, the laser lights are of different wave lengths. Specifically, the wave lengths described in the patent are 635 nm, 670 nm, and 780 nm. Such beams belong to red or infrared beam region. Thus, the technology described in the patent still has a shortcoming of not enabling human eyes to recognize whether light beams are being projected onto a bar code symbol.

BRIEF SUMMARY OF THE INVENTION

An object of the invention is to provide a bar code reading apparatus that improves human recognition, even though the power of the laser beam used in the apparatus is weak so as to protect human eyes.

Another object of the invention is to provide a bar code reading apparatus that is capable of reading a bar code containing a large amount of information.

According to the present invention, a bar code reading apparatus contains a first light source for radiating a first ray, a second light source for radiating a second visible ray that has higher visibility for human eyes than the first ray, and a photo detector for receiving the first ray after being reflected by a bar code symbol.

According with another aspect of the invention, the bar code reading apparatus comprises, a first light source for radiating a first ray, a second light source for radiating a second visible ray that has a higher visibility for human eyes than the first ray, a first photo detector for receiving said first ray after being reflected by a bar code symbol, and a second photo detector for receiving said second visible ray after being reflected by said bar code symbol.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentality and combinations particularly pointed out in the appended claims.

The invention itself, together with further objects and attendant advantages, will best be understood by reference to the following detailed description taken in conjunction with the accompanying figures.

BRIEF DESCRIPTION OF THE SEVERAL VIEWS OF THE DRAWING

FIGS. 6(a)–6(d) show perspective views of further embodiments of the present invention.

FIG. 6(e) shows a timing chart of the driving pulses supplied to each light source.

DETAILED DESCRIPTION OF THE INVENTION

Figure 1:
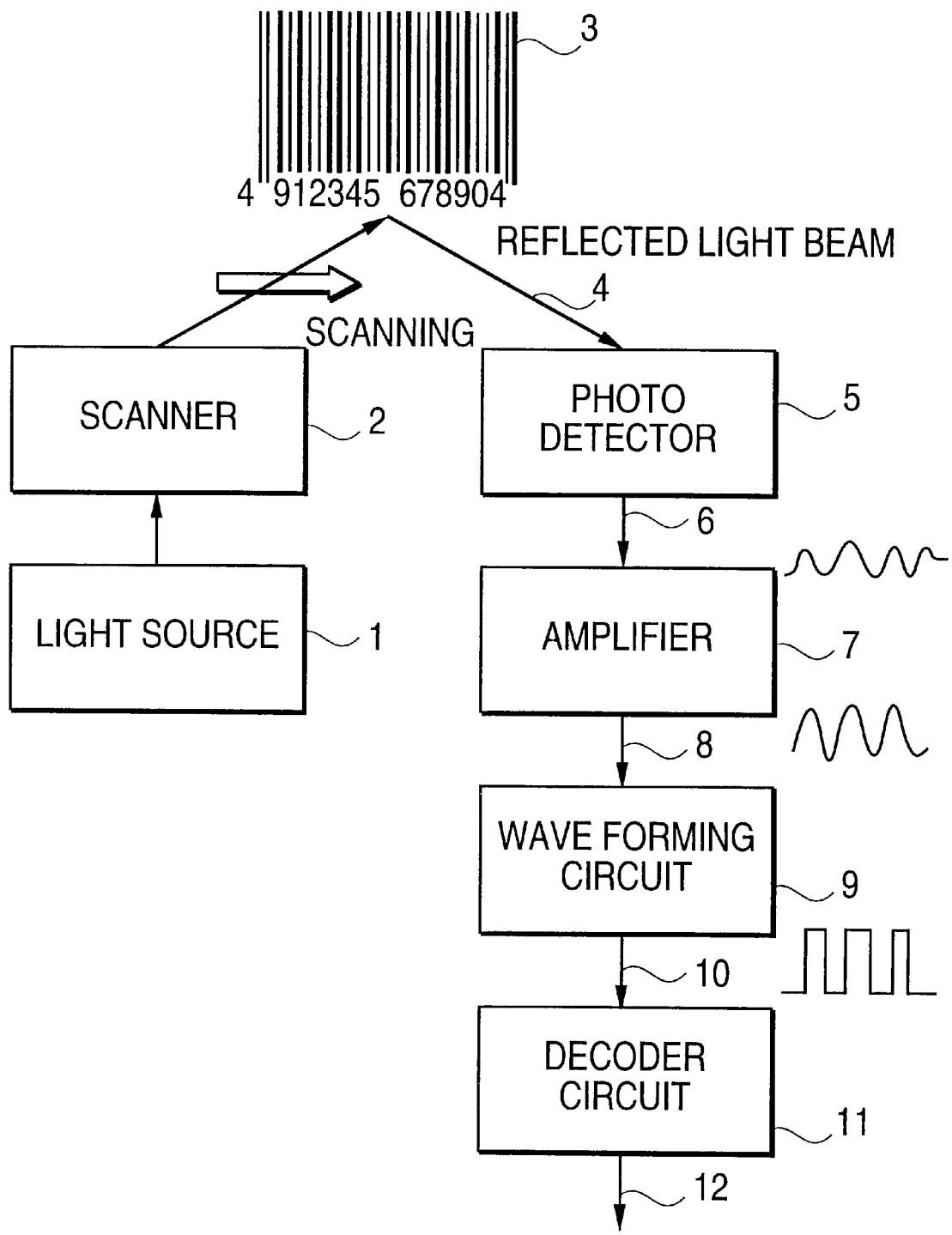
FIG. 1 shows an block diagram of conventional bar code reading apparatus.
Figure 2A:
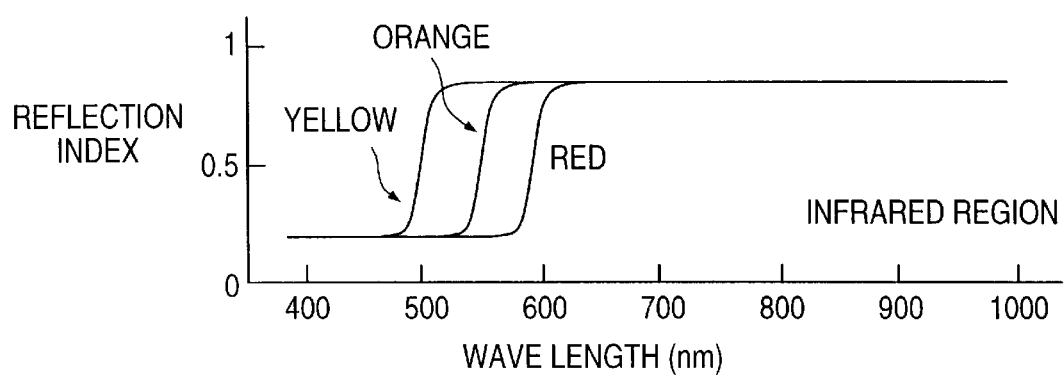
FIGS. 2(a) and 2(b) show graphs representing a relationship between colors of bar code symbols and a wave length of a light beam.
Figure 2B:
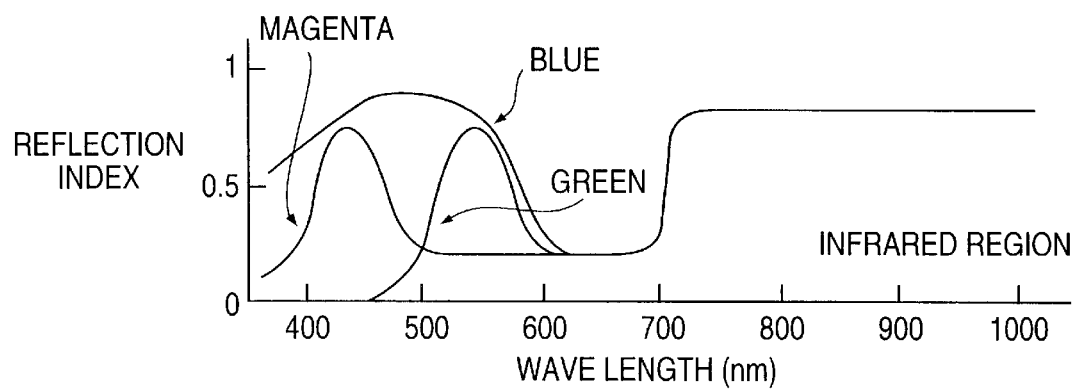
Figure 3A:
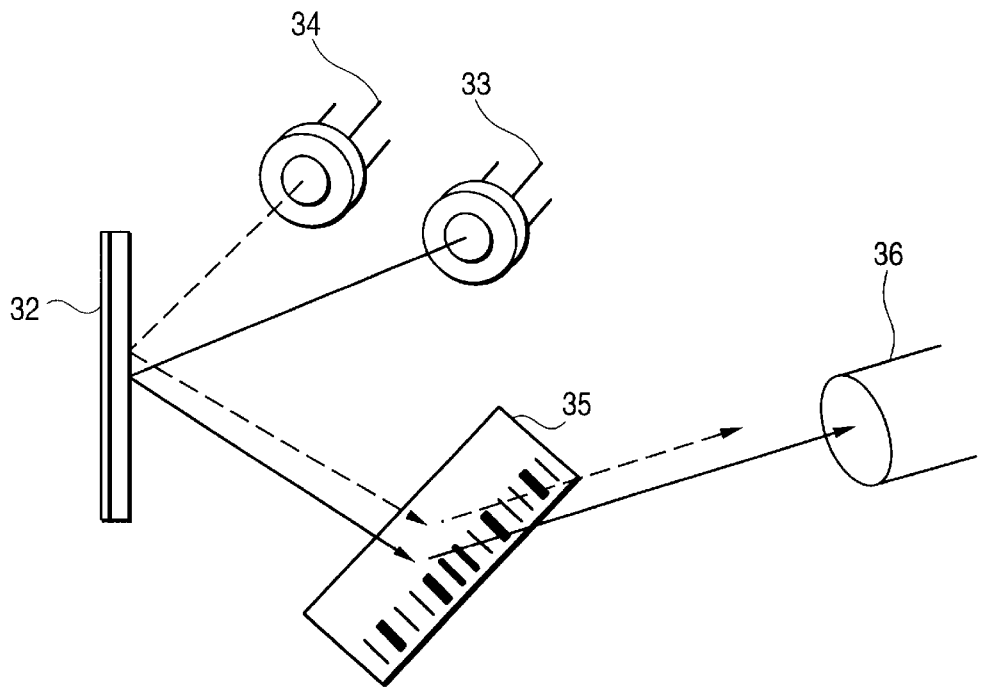
FIG. 3(a) shows a perspective view of one embodiment of the present invention.

FIG. 3(a) is a schematic depiction of a preferred embodiment of the present invention. The bar code reading apparatus shown in FIG. 3(a) contains a scanner 32, a first light source 33, a second light source 34, and a photo detector 36. The first and second light sources 33 and 34 are laser diodes or LEDs. The photo detector 36 is a photo diode. The photo detector 36 is coupled to a decoder circuit and following stages (not shown), as well as the conventional bar code reading apparatus depicted in FIG. 1.

The first light source 33 radiates a red or infrared light beam as a first ray. For convenience, the following description refers to only a red light beam as a first ray. The second light source 34 radiates a green light beam having a wave length between 500 nm and 550 nm as a second visible ray. The scanner 32 consists of a mirror. The mirror reflects the light beams from the first light source 33 and the second light source 34 to a bar code symbol 35.

Figure 4A:
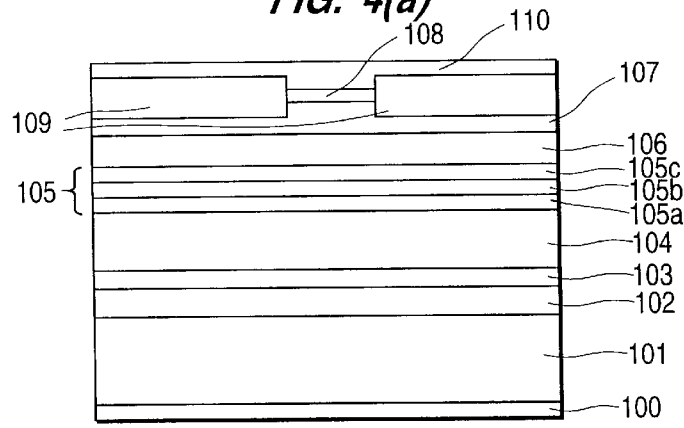
FIGS. 4(a) and (c) show cross section views of embodiments of light sources.
Figure 4C:
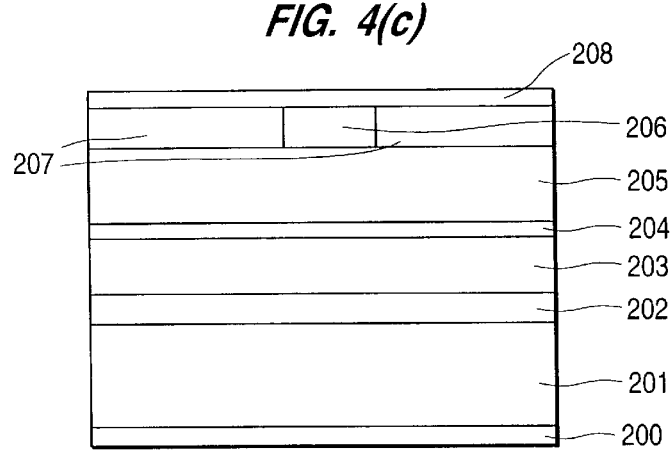
FIGS. 4(b) and (d) show graphs representing a relationship between a forbidden band and a composition ratio of different components in the light sources.
FIG. 4(e) shows an example of a light source.

FIGS. 4(a) and 4(c) shows examples of the second light source, which can radiate a green light beam. FIG. 4(a) shows a first embodiment of a laser diode that can radiate an approximately 500 nm wave length laser beam. The laser diode comprises, n-electrode 100, n-type GaAs substrate 101, n-type GaAs buffer layer 102, n-type ZnSe buffer layer 103, n-type ZnMgSSe cladding layer 104, light emitting layer 105, p-type ZnMgSSe cladding layer 106, p-type ZnSSe cap layer 107, p-type ZnTeSe contact layer 108, current blocking layer 109, and p-electrode 110. The light emitting layer 105 comprises n-type ZnSSe confinement layer 105a, ZnCdSe quantum well layer 105b and p-type ZnSSe confinement layer 105c. An example of a composition of a laser diode is shown in Table 1 below. Specifically, the concentration of impurity and the thickness of each layer is shown in Table 1.

TABLE 1

| Layer | Thickness | Concentration of impurity |
|---|---|---|
| n-GaAs substrate 101 | 200 nm | $1 \times 10^{18}$ cm$^{-3}$ |
| n-GaAs buffer layer 102 | 200 nm | $1 \times 10^{18}$ cm$^{-3}$ |
| n-ZnSe buffer layer 103 | 20 nm | $1 \times 10^{18}$ cm$^{-3}$ |
| n-ZnMgSSe cladding layer 104 | 900 nm | $1 \times 10^{18}$ cm$^{-3}$ |
| n-ZnSSe confinement layer 105a | 50 nm | $5 \times 10^{17}$ cm$^{-3}$ |
| Zn(1-x)Cd(x)Se quantum well layer 105b | 50 nm | |
| p-ZnSSe confinement layer 105c | 50 nm | $5 \times 10^{17}$ cm$^{-3}$ |
| p-ZnMgSSe cladding layer 106 | 700 nm | $3 \times 10^{17}$ cm$^{-3}$ |
| p-ZnSSe confinement layer 107 | 200 nm | $5 \times 10^{17}$ cm$^{-3}$ |
| p-ZnTeSe contact layer 108 | 50 nm | $1 \times 10^{18}$ cm$^{-3}$ |

Figure 4B:
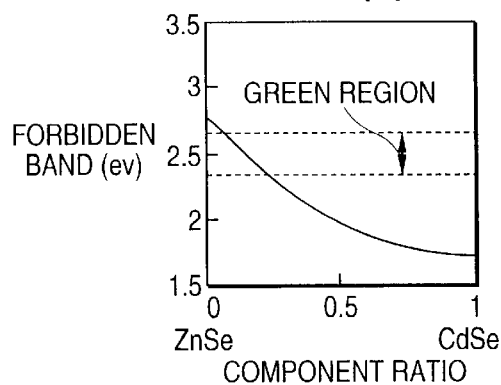

The composition of Zn(1−x)Cd(x)Se quantum well layer primarily contributes to a wave length. FIG. 4(b) shows a graph representing the relationship between a forbidden band and a composition ratio of Cd(x) in the quantum well layer. If the component ratio of Cd is approximately 0.1 through 0.3, it is expected that the laser diode will radiate a green light beam.

FIG. 4(c) shows another embodiment of a diode that can radiate a green light beam. The diode is comprises, n-electrode 200, n-type SiC substrate 201, GaN buffer layer 202, n-type AlGaN cladding layer 203, InGaN/AlGaN multi-quantum well layer 204, p-type AlGaN cladding layer 205, p-type GaN contact layer 206, current blocking layer 207, and p-electrode 208. An example of a composition of a laser diode according to this embodiment is shown in Table 2 below. Specifically, the concentration of impurity and the thickness of each layer is shown in Table 2.

TABLE 2

| Layer | Thickness | Concentration of impurity |
|---|---|---|
| n-SiC substrate 201 | | $1 \times 10^{18}$ cm$^{-3}$ |
| n-GaN buffer layer 202 | 1000 nm | $1 \times 10^{18}$ cm$^{-3}$ |
| n-AlGaN cladding layer 203 | 1000 nm | $1 \times 10^{18}$ cm$^{-3}$ |
| In(x)Ga(1-x)N/AlGaN multi-quantum well layer 204 | | |
| p-AlGaN cladding layer 205 | 1000 nm | $1 \times 10^{18}$ cm$^{-3}$ |
| p-GaN contact layer 206 | 100 nm | $1 \times 10^{18}$ cm$^{-3}$ |

Figure 4D:
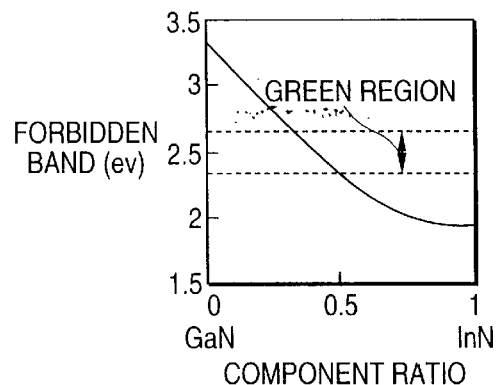

The composition of In(x)Ga(1−x)N/AlGaN multi-quantum well layer primarily contributes to a wave length. FIG. 4(d) shows a graph representing a relationship between the forbidden band and the composition ratio of In(x) in the quantum well layer. If component ratio of In(x) is approximately 0.4 through 0.5, it is expected that the diode will radiate a green light beam.

Figure 4E:
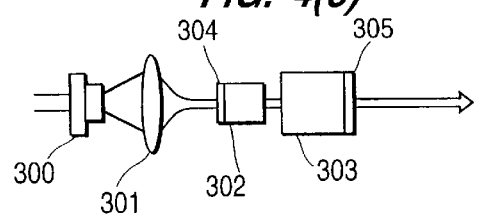

FIG. 4(e) shows an example of Second Harmonics Generator (SHG) for radiating a green laser beam. The laser diode (AlGaAs/GaAs) 300 radiates a laser beam having a 809 nm wave length. The laser beam is led to a crystal (YAG or YVO4) 302 via a lens 301. Then, a laser beam having a 1064 nm wave length is induced. The induced 1064 nm laser beam is led to a KTP crystal (KTiOPO3) 303, which is a SHG crystal. Then, a laser beam having 532 nm wave length is radiated. In this embodiment, SHG comprises an internal resonance structure employing a first high reflecting mirror 304 at the input edge of the crystal (YAG or YVO4) 302, and second high reflecting mirror 305 at the output edge of the crystal (KTP) 303, whereby effective laser oscillation is attained. The mirrors comprise TiOx/SiOx.

According to the aforementioned bar code reading apparatus, the second light source 34 can radiate a green light beam onto a bar code symbol, and in addition, the first light source 33 can radiate a red light beam onto the bar code symbol. The green light beam radiated by the second light source 34 can be used for a monitoring operation and/or a signal reading operation. For example, the green light beam projected onto bar code can be used for recognition by human eyes as part of a monitoring operation. Or for example, the green light beam projected onto bar code can be used also used for reading information carried on the bar code symbol.

It is well known that a light having a wave length of approximately 550 nm is brightest for human eyes, and that the visual sensitivity of human eyes decreases as the wave length departs from 550 nm. The green light source shown in FIG. 4(*a*) is expected to radiate a light beam having a wave length of approximately 500 nm through 520 nm, which is very close to the brightest light beam acceptable by human eyes. According to a visual sensitivity index, it is known that the brightness of a green light beam is more than 20 times that of the brightness of a red light beam, when the same driving power is used to generate each light beam. For example, the visual sensitivity index of a light beam having a 520 nm wave length is 484 lm/w (lumen/watt) whereas, the visual sensitivity index of a light beam having a 670 nm wave length is 21.8 lm/w. Thus, it is very useful to use the green light beam for the monitoring operation.

Figure 3B:
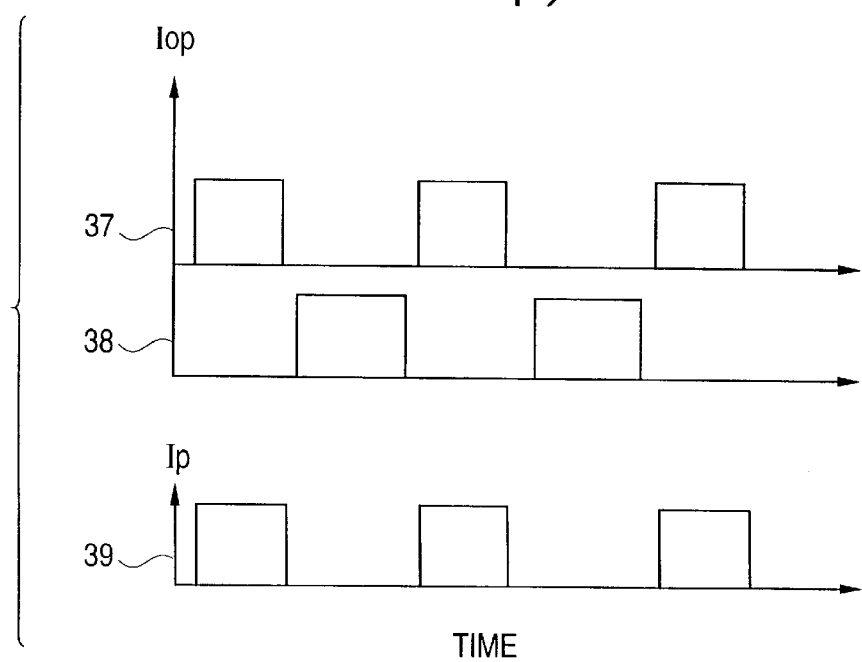
FIG. 3(b) shows a timing chart of one embodiment of the present invention.

In FIG. 3(*a*), the first light source 33 and the second light source 34 project the red light beam and the green light beam, respectively, onto a bar code symbol 35 via scanner 32. The red light beam from the first light source 33 is used for the reading operation and the green light beam from the second light source 34 is intended to support the monitoring operation. Since only the red light beam is used for the reading operation, it is necessary for the photo detector 36 to receive only the reflected red light beam. For this purpose, the first light source and the second light source are controlled so that one light source radiates a light beam alternately to the other light source.

FIG. 3(*b*) shows a timing chart representing an example of drive signals supplied to both the first light source and the second light source. Signal 37 represents a drive signal to be supplied to the first light source 33. Signal 38 represents a drive signal to be supplied to the second light source 34. The signal 37 and the signal 38 are timely shared. Signal 39 represents a gate signal for the photo detector 36. The photo detector 36 can receive a reflected beam during the high level period of the signal 39. It should be apparent from the timing chart of FIG. 3(*b*), that the signal 39 is identical to the signal 37. However, a shorter pulse width of the signal 39 is available so as to completely overlap the signal 37. The frequency of each signal is preferably selected to be between about 50 Hz and 60 Hz, to take advantage of commercially available frequencies, and it facilitates designing a drive circuit for supplying the pulses. However, higher or lower frequencies can be used.

The photo detector 36 is enabled during the high level period of the signal 39, and is disabled during the lower level period. As the result, the photo detector 36 only receives the reflected red light beam. The received reflected red light beam is converted to a corresponding electric signal.

According to the above embodiment, the green light beam is intended to support human recognition of the bar code symbol to be scanned, and the red light beam is only used for reading the bar code. As aforementioned, the green light beam is easily recognized by human eyes; certainly more easily recognizable by human eyes than the red light beam. Therefore, an operator of a bar code reading apparatus according to the present invention can easily recognize whether the light beams are appropriately projected onto a bar code symbol, whereby the bar code reading apparatus of the present invention provides high maneuverability. The on and off ratio of the signals 37 and 38 does not have to be fixed to the ratio described for this preferred embodiment. Since the color of a beam is determined by a combination ratio of the two beams, it is possible to adjust the color of the beam projected on the bar code symbol 35 by an adjustment of the on and off ratio of the signals 37 and 38.

Further embodiments of the present invention are described below.

Figure 5A:
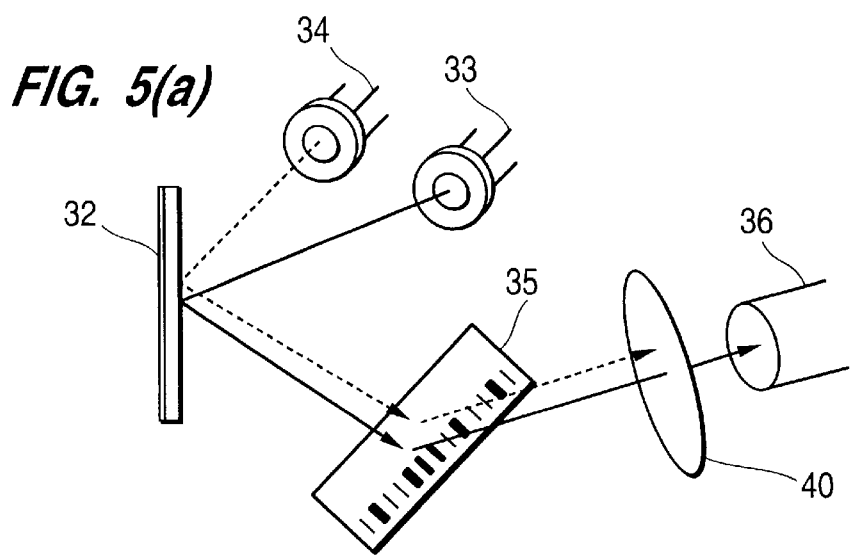
FIGS. 5(a)–5(c) show perspective views of other embodiments of the present invention.
Figure 5B:
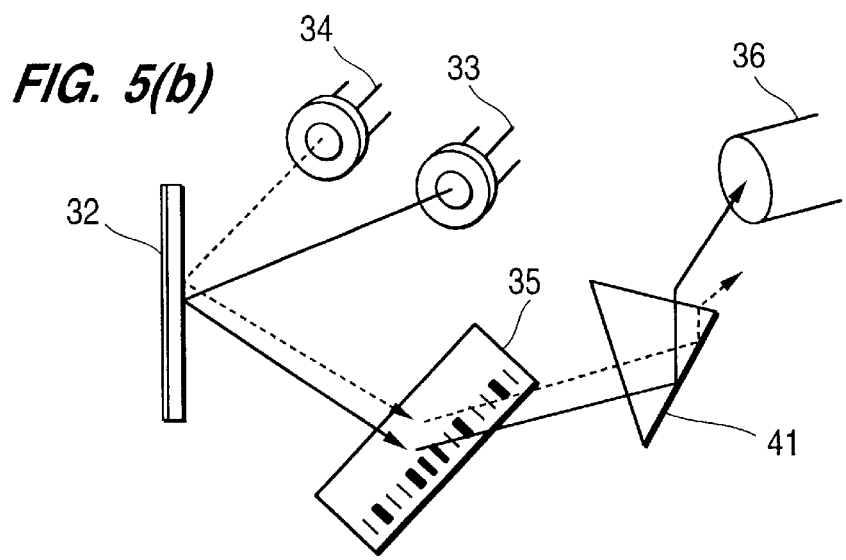
Figure 5C:
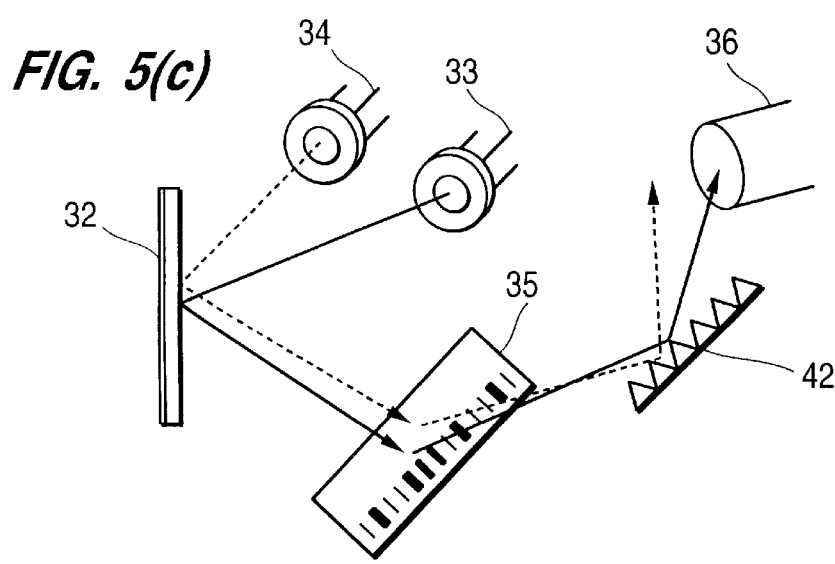

FIGS. 5(*a*)–5(*c*) show more preferred embodiments of the present invention. Just as for the embodiment shown in FIG. 3, a red light beam is radiated from the first light source 33, and a green light beam is radiated from the second light source 34. Both light beams are simultaneously projected onto the bar code symbol 35 via the scanner 32. In this embodiment, the reflected green light beam is blocked, or directed to another direction.

FIG. 5(*a*) shows an embodiment for blocking the reflected green light beam. In order to block the reflected green light beam, an optical filter 40 is employed in front of the photo detector 36. The optical filter can cut off a light beam having a wave length less than 600 nm. It is also possible to use an alternative filter or similar device, which can block the green light beam and pass the red light beam. In this embodiment, the reflected red light beam reflected from the bar code label 35 goes to the photo detector 36 via the optical filter 40. However, the green light beam reflected from the bar code label 35 is blocked by the optical filter 40. The photo detector 36 eventually receives only the reflected red light beam.

FIGS. 5(*b*) and (*c*) show embodiments that can steer the reflected green light beam in another direction, away from the photo detector 36. The embodiment shown in FIG. 5(*b*) uses a prism 41, and the embodiment shown in FIG. 5(*c*) uses a grating element 42. The prism 41 and the grating element 42 can lead the reflected red light beam to the photo detector 36. However, the reflected green light beam is led in a direction other than in a direction to the photo detector 36.

According to the embodiments shown in FIGS. 5(*a*)–5(*c*), the light beams from the first light source 33 and the second light source 34 are projected onto the bar code symbol 35. Therefore, human recognition is higher, because an effective power of the light beams is rather high. In addition, a signal to noise ratio is improved, because the reflected green light beam is not directed to the photo detector.

Next, further embodiments of the present invention are described in which the green light beam is also used for the reading operation.

FIGS. 6(*a*)–6(*d*) show embodiments in which both of the red and green light beams are used for the reading operation.

In FIG. 6(*a*), a red light beam from a first light source 33 is radiated to a pair of bar code symbols 35*a* and 35*b*, and a green light beam from a second light source 34 is radiated to the same bar code symbols 35*a* and 35*b*. The scanner 32 directs the light beams from the first light source 33 and the second light source 34 to the bar code symbols 35*a* and 35*b* alternately. Light beams reflected from the bar code symbols are directed to photo detectors 36a and 36b. An optical filter 40a, which can cut a light beam having less than 600 nm wave length, is used in front of the photo detector 36a. Another optical filter 40b, which can cut a light beam having more than 600 nm wave length, is used in front of the photo detector 36b. According to the embodiment shown in FIG. 6(a), the reflected red light beam, which has a wave length of more than 600 nm, is received by the photo detector 36a. However, the reflected green light beam, which has a wave length of less than 600 nm, is only received by the photo detector 36b.

In FIG. 6(b), the first and second light sources 33 and 34 radiate the red light beam and the green light beam, respectively, just as described above with respect to the embodiment shown in FIG. 6(a). In FIG. 6(b), the light beams projected onto the bar code symbols 35a and 35b are reflected from the symbols to a first prism 41a and to a second prism 41b. The first prism 41a functions to lead the red light beam to a first photo detector 36a, but not the green light beam. The first prism 41a functions to lead the green light beam in a direction away from the first photo detector 36a. On the other hand, the second prism 41b functions to lead the green light beam to a second photo detector 36b, but not the red light beam. The second prism 41b functions to lead the red light beam in a direction away from the second photo detector 36b. The first photo detector 36a then detects the reflected red light beam, and the second photo detector 36b detects the reflected green light beam.

In FIG. 6(c), the light beams, which are radiated from the first light source 33 and the second light source 34, are reflected by the symbols to a first grating element 42a and to a second grating element 42b. The first grating element 42a leads the red light beam to the first photo detector 36a, and leads the green light beam in other directions away from the first photo detector 36a. The second grating element 42b leads the green light beam to the second photo detector 36b, and leads the red light beam in other directions away from the second photo detector 36b. The first photo detector 36a functions to detect the reflected red light beam, and the second photo detector 36b functions to detect the reflected green light beam.

In the embodiment depicted in FIG. 6(d), the light beams radiated from the first light source 33 and the second light source 34 are projected onto the bar code symbols 35a and 35b alternately via the mirror 32. In this embodiment, one light source is periodically driven, and another light source is alternately driven. The light beams projected onto the bar code symbols 35a and 35b are led to the first and second photo detector 36a and 36b. The first photo detector 36a is periodically enabled so that an enabling period for the first photo detector overlaps the driving period of the first light source 33. On the other hand, the second photo detector 36b is also periodically enabled so that an enabling period for the second photo detector overlaps the driving period of the second light source 34.

FIG. 6(e) shows a timing chart of the driving pulses supplied to each light source, and the gate pulses that enable or disable each photo detector. A signal 37 represents a driving pulse to be supplied to the first light source 33, and a signal 38 represents a driving pulse to be supplied to the second light source 34. A signal 39 represents a gate pulse to be supplied to the first photo detector 36a. A signal 43 represents a gate pulse to be supplied to the second photo detector 36b. As shown in FIG. 6(e), the signal 37 is identical to the signal 39, and the signal 38 is identical to the signal 43. However, shorter pulse width of the signal 39 and the signal 43 can be used, so that a high level period of the signals 39 and 43 is completely overlapped with a high level period of the signals 37 and 38.

According to the embodiments shown in FIGS. 6(a)–(d), it is possible to read bar code symbols that contain more information than a single bar code symbol. For example, if a color of the bar code symbol 35a is red, and a color of the bar code symbol 35b is blue, the bar code symbol 35a can be read by the green light beam, and the bar code symbol 35b can be read by the red light beam. Although the scanner 32 scans one bar code symbol after another 35a, 35b, the reading operation can be completed as if bar code symbols were simultaneously scanned, because the scanning speed of the scanner 32 is rather high.

Furthermore, if a color of the bar code symbol 35a is black, and a color of bar code symbol 35b is red or blue, both bar code symbols can be read. Specifically, a black bar code symbol is readable using both red and green light beams, and the other bar code symbol (red or blue) is readable using at least one of the light beams.

According to the embodiments shown in FIGS. 6(a)–(d), it is possible to read a variety of designs of bar code symbols. For example, conventional bar code symbols are printed in single color, such as in black. If the bars were arranged in several rows, they would only give a monotonous impression. However, a bar code reading apparatus according to the present invention is capable of reading several colored bar code symbols at once. Therefore, the present invention has the advantage of permitting bar code symbols be designed in a wide variety, thereby broadening the use of the bar code reading apparatus of the present invention.

Moreover, since the green light beam is projected on both bar code symbols 35a and 35b, it is easy for human eyes to recognize whether light beams are appropriately projected onto the bar code symbols or not.

In accordance with the present invention, a green light beam is projected onto a bar code symbol in addition to a red light beam. As a result, the bar code reading apparatus provides the additional advantage of permitting human eyes to recognize the bar code symbol.

Moreover, in accordance with the present invention, it is possible for more information to be read from bar code symbols in comparison to a conventional bar code system.

Of course, it should be understood that a wide range of changes and modifications can be made to the preferred embodiment described above and that the foregoing description be regarded as illustrative rather than limiting. It is therefore intended that it is the following claims, including all equivalents, which are intended to define the scope of this invention.

What is claimed is:

1. A bar code reading apparatus comprising:
   a first light source for radiating a first ray on a bar code symbol;
   a second light source for radiating a second visible ray that has higher visibility for human eyes than the first ray on a bar code symbol; and
   a photo detector for receiving the first ray after being reflected by a bar code symbol, said first and second light sources being alternately driven during a reading operation of said bar code reading apparatus.

2. The bar code reading apparatus as recited in claim 1, wherein said first light source is a first laser diode radiating a first laser beam having a wave length between about 630 nm and 830 nm.

3. The bar code reading apparatus as recited in claim 1, wherein said second light source is a second laser diode radiating a second laser beam having a wave length between about 500 nm and 550 nm.

4. The bar code reading apparatus as recited in claim 1, wherein said photo detector is enabled during a time that said first light source is driven.

5. A bar code reading apparatus comprising:

a first light source for radiating a first ray on a bar code symbol;

a second light source for radiating a second visible ray that has higher visibility for human eyes than the first ray on a bar code symbol; and a photo detector for receiving the first ray after being reflected by a bar code symbol, said first and second light sources being simultaneously driven during a reading operation of said bar code reading apparatus.

6. The bar code reading apparatus as recited in claim 5, further comprising:

an optical element inserted in an optical path between said bar code symbol and said photo detector for leading only said first ray to said photo detector.

7. The bar code reading apparatus as recited in claim 6, wherein said optical element is an optical filter for blocking a light beam having a wave length of said second visible ray.

8. The bar code reading apparatus as recited in claim 6, wherein said optical element is a prism for leading a light beam having a wave length of said second visible ray in a direction away from said first photo detector.

9. The bar code reading apparatus as recited in claim 6, wherein said optical element is a grating element for leading a light beam having a wave length of said second visible ray in a direction away from said first photo detector.

10. A bar code reading apparatus comprising:

a first light source for radiating a first ray;

a second light source for radiating a second visible ray that has higher visibility for human eyes than the first ray;

a first photo detector receiving said first ray after being reflected by a bar code symbol; and a second photo detector receiving said second visible ray after being reflected by said bar code symbol.

11. The bar code reading apparatus as recited in claim 10, wherein said first light source is a first laser diode radiating a first laser beam having a wave length between about 630 nm and 830 nm.

12. The bar code reading apparatus as recited in claim 10, wherein said second light source is a second laser diode radiating a second laser beam having a wave length between about 500 nm and 550 nm.

13. The bar code reading apparatus as recited in claim 10, further comprising:

a first optical element inserted in an optical path between said bar code symbol and said first photo detector for leading said first ray to said first photo detector; and a second optical element inserted in an optical path between said bar code symbol and said second photo detector for leading said second visible ray to said second photo detector.

14. The bar code reading apparatus as recited in claim 10, wherein said first light source and said second light source are alternately driven.

15. The bar code reading apparatus as recited in claim 14, wherein said first photo detector is enabled during a time that said first light source is driven, and said second photo detector is enabled during a time that said second light source is driven.

16. The bar code reading apparatus as recited in claim 13, wherein said first optical element is a first optical filter for blocking a light beam having a wave length of said second visible ray; and wherein said second optical element is a second optical filter for blocking a light beam having a wave length of said first ray.

17. The bar code reading apparatus as recited in claim 13 wherein said first optical element is a first prism for leading a light beam having a wave length of said second visible ray in a direction away from said first photo detector, and, wherein said second optical element is a second prism for leading a light beam having a wave length of said first ray in a direction away from said second photo detector.

18. The bar code reading apparatus as recited in claim 13, wherein said first optical element is a first grating element for leading a light beam having a wave length of said second visible ray in a direction away from said first photo detector, and wherein said second optical element is a second grating element for leading a light beam having a wave length of said first ray in a direction away from said second photo detector.

19. The bar code reading apparatus as recited in claim 4, further comprising:

a first drive signal for driving said first light source;

a second drive signal for driving said second light source; and a control signal controlling operation of said photo detector, said control signal not being provided when said second drive signal is provided.

20. The bar code reading apparatus as recited in claim 15, further comprising:

a first drive signal for driving said first light source;

a second drive signal for driving said second light source;

a first control signal controlling operation of said first photo detector; and a second control signal controlling operation of said second photo detector, said first control signal being provided when said first drive signal is provided, said second control signal being provided when said second drive signal is provided.

* * * * *